United States Patent
Damale (10) Patent No.: US 8,667,423 B2
(45) Date of Patent: Mar. 4, 2014

(54) MULTI-TOUCH WALLPAPER MANAGEMENT

(75) Inventor: Shridhar Damale, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 349 days.

(21) Appl. No.: 12/535,521

(22) Filed: Aug. 4, 2009

(65) Prior Publication Data

US 2011/0035708 A1   Feb. 10, 2011

(51) Int. Cl.
*G06F 3/048* (2013.01)

(52) U.S. Cl.
USPC ............ 715/863; 715/763; 715/765; 715/788

(58) Field of Classification Search
USPC .................. 715/863, 763, 765, 788; 345/173
See application file for complete search history.

(56) References Cited

U.S. PATENT DOCUMENTS

| | | | |
|---|---|---|---|
| 6,366,286 B1* | 4/2002 | Hermanson | 345/473 |
| 2006/0026536 A1* | 2/2006 | Hotelling et al. | 715/863 |
| 2006/0125799 A1* | 6/2006 | Hillis et al. | 345/173 |
| 2009/0061837 A1* | 3/2009 | Chaudhri et al. | 455/418 |
| 2009/0172532 A1* | 7/2009 | Chaudhri | 715/702 |

* cited by examiner

*Primary Examiner* — Omar Abdul-Ali
*Assistant Examiner* — Phuong Nguyen (57) ABSTRACT

A method and apparatus for multi-touch wallpaper management for a mobile computing device are described wherein a first wallpaper image is displayed on a multi-touch-sensitive display of the mobile computing device and a multi-touch gesture is received indicating a request to change the first wallpaper image. In response to the multi-touch gesture, at least a portion of a second wallpaper image is displayed. Other embodiments are described and claimed.

22 Claims, 5 Drawing Sheets

DISPLAY A FIRST WALLPAPER IMAGE ON A MULTI-TOUCH-SENSITIVE DISPLAY OF A MOBILE COMPUTING DEVICE
302

RECEIVE A MULTI-TOUCH GESTURE INDICATING A REQUEST TO CHANGE THE FIRST WALLPAPER IMAGE
304

DISPLAY AT LEAST A PORTION OF A SECOND WALLPAPER IMAGE IN RESPONSE TO THE MULTI-TOUCH GESTURE
306

MULTI-TOUCH WALLPAPER MANAGEMENT

BACKGROUND

Mobile computing devices, such as smart phones, may provide a wide array of processing capabilities such as digital assistant (PDA) features, including word processing, spreadsheets, synchronization of information (e.g., e-mail) with a desktop computer, and so forth. In addition, such devices may have wireless communications capabilities to provide features, such as mobile telephony, mobile e-mail access, web browsing, and content (e.g., video and radio) reception. Exemplary wireless communications technologies include cellular, satellite, and mobile data networking technologies.

As the functionality and processing power provided by mobile computing devices continues to increase, programs, applications and user interactions with the devices continue to become more dynamic and responsive to touch and/or gestures. Wallpapers and desktop backgrounds, however, remain non-dynamic or static. As a result, it may be desirable to provide a method and apparatus for dynamically managing wallpapers for a mobile computing device. For example, it may be advantageous to manage wallpapers using multi-touch gestures on a multi-touch-sensitive display of a mobile computing device. Consequently, there exists a substantial need for techniques to improve the dynamic management of wallpaper images.

DETAILED DESCRIPTION

Various embodiments may be generally directed to methods and apparatus for multi-touch wallpaper management. Some embodiments may be particularly directed to dynamically changing wallpaper and/or background images on the desktop of a mobile computing device using multi-touch gestures.

In one embodiment, for example, a mobile computing device may be configured to display a first wallpaper image on a multi-touch-sensitive display, receive a multi-touch gesture indicating a request to change the first wallpaper image, and display at least a portion of a second wallpaper image in response to the multi-touch gesture. Other embodiments are described and claimed.

Changing wallpaper images on current mobile computing devices requires multiple steps to open preferences or settings menus and drill down through various folders to locate a desired image, select the image and confirm that the selected image is appropriate. Providing for the dynamic management of wallpaper images or applications may result in a more interesting and interactive user experience. For example, users may be able to simply and efficiently change wallpapers and add to their enjoyment of their mobile computing device experience. Furthermore, increased functionality and simplicity may distinguish one mobile computing device from another mobile computing device that does not offer similar functionality.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals. Other embodiments are described and claimed.

Figure 1A:
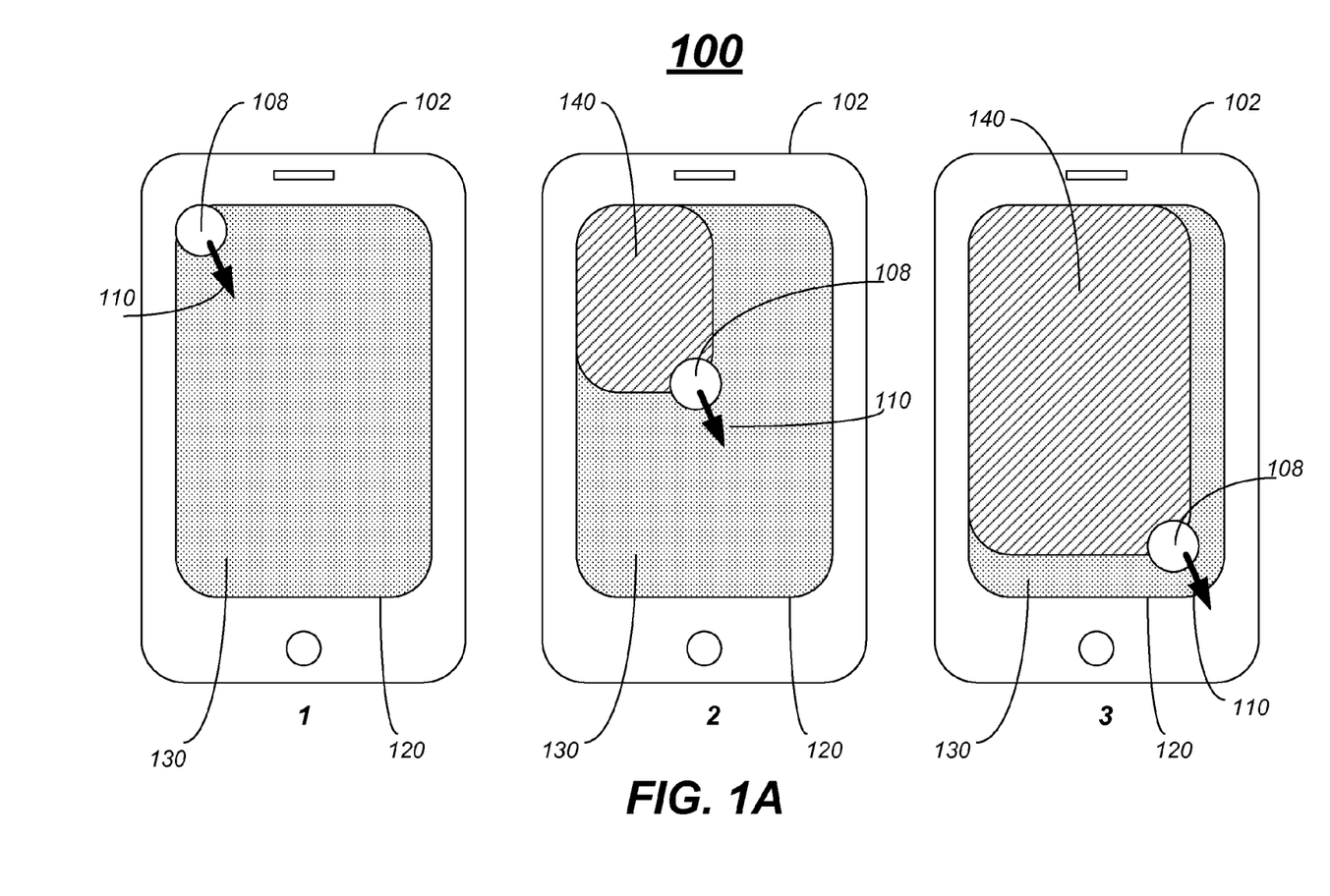
FIG. 1A illustrates one embodiment of a mobile computing device.

FIG. 1A illustrates one embodiment of a transition flow 100 for a series of mobile computing devices 102. In particular, FIG. 1A shows a first embodiment of a mobile computing device 102 in three states, FIG. 1A-1, FIG. 1A-2 and FIG. 1A-3, each illustrating the same mobile computing device 102 in a different state of a wallpaper transition. The mobile computing device 102 may include by way of example and not limitation a display 120, a first wallpaper image 130 and a second wallpaper image 140. These elements or portions of these elements may be implemented in hardware, software, firmware, or in any combination thereof. Mobile computing device 100 may also include a housing to contain the device components as well as various other components described in more detail below with reference to FIG. 2 and FIG. 4. The embodiments are not limited to these depicted elements.

The mobile computing device 102 may be generally configured to support or provide cellular voice communication, wireless data communication and computing capabilities. The mobile computing device 102 may be implemented as a combination handheld computer and mobile telephone, sometimes referred to as a smart phone. Examples of smart phones include, for example, Palm® products such as Palm® Pre™ or Palm® Treo Pro™ smart phones. Although some embodiments may be described with the mobile computing device 102 implemented as a smart phone by way of example, it may be appreciated that the embodiments are not limited in this context. For example, the mobile computing device 102 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

Display 120 may comprise a multi-touch-sensitive display in some embodiments. The multi-touch-sensitive display may consist of a touch screen or touchpad that when configured with appropriate software is capable of recognizing multiple simultaneous touch points or gestures as well as individual touch points and gestures. The gestures may be recognized through a variety of means, including but not limited to: heat, finger pressure, high capture rate cameras, infrared light, optic capture, tuned electromagnetic induction, ultrasonic receivers, transducer microphones, laser rangefinders, and shadow capture. Other embodiments are described and claimed.

In various embodiments, mobile computing device 102 may be configured to display a first wallpaper image 130 on a multi-touch-sensitive display 120 of a mobile computing device 102 as illustrated at FIG. 1A-1. To change or transition the wallpaper image, a multi-touch gesture 108 indicating a request to change the first wallpaper image 130 may be received. The multi-touch gesture is illustrated as a finger touch 108 in FIG. 1A. In various embodiments, the gesture may include a multi-finger touch, a sliding gesture, a twisting gesture, a pinch-in gesture, a pinch-out gesture or any other gesture with one or more figures sufficient to indicate a desire to change the first wallpaper image 130. Additionally, the gesture may be recognized if performed by any suitable pointing device other than a finger in various embodiments, such as a stylus or mouse, for example.

As shown in FIG. 1A, 1-3, the multi-touch gesture 108 may be a diagonal sliding motion in a direction 110 in some embodiments. In various embodiments, the multi-touch gesture 108 indicating a request to change the first wallpaper image 130 may comprise a left-to-right, right-to-left, top-to-bottom, bottom-to-top or corner-to-corner diagonal scrolling gesture beginning at one of four edges of the first wallpaper image 130 and ending at an opposite edge of the first wallpaper image 130 or beginning at one of four corners of the first wallpaper image 130 and ending at an opposite corner of the first wallpaper image 130. In some embodiments, the multi-touch gesture 108 indicating a request to change the first wallpaper image 130 may comprise a pinch-in gesture or a pinch-out gesture to resize the first wallpaper image. Other embodiments are described and claimed.

In various embodiments, in response to the multi-touch gesture 108, at least a portion of a second wallpaper image 140 may be displayed. The scrolling gesture 108 may result in a proportional portion of the second wallpaper image 140 being displayed along with a proportional portion of the first wallpaper image 130 based on a position of the scrolling gesture 108 on the multi-touch-sensitive display 120 in some embodiments. For example, as shown in FIG. 1A, as the user moves a finger (e.g. 108) from the top left corner of the display 120 in FIG. 1A-1 in a direction indicated by 110 to a point near the middle of the display 120 in FIG. 1A-2, a proportional portion of the second wallpaper image 140 is displayed or revealed while a proportional portion of the first wallpaper image 130 remains visible. Likewise, as the user continues to move their finger from the position illustrated in FIG. 1A-2 to a position near the bottom right corner of the display 120 in FIG. 1A-3, a greater portion of the second wallpaper image 140 is revealed.

In some embodiments, the second wallpaper image 140 may be selected and retained by completing the multi-touch gesture 108. For example, as shown in FIG. 1A, the second wallpaper image 140 may be retained and may replace the first wallpaper image 130 if the user completes the multi-touch gesture 108 by sliding their finger completely from the top left corner of the display 120 to the bottom right corner of the display 120 or making another gesture defined as a complete gesture. In some embodiments, a multi-touch gesture revealing a predefined portion of the second wallpaper image 140, more than half of the image 140 for example, may result in the second wallpaper image 140 replacing the first wallpaper image 130. Other embodiments are described and claimed.

In various embodiments, the multi-touch gesture 108 may be recognized in a plurality of directions. For example, the multi-touch gesture need not be made in a straight line. A user may, for example, move their finger from the wallpaper transition starting point to any other point on the screen to reveal a corresponding portion of the next wallpaper image. Additionally, just as a multi-touch gesture 108 in one direction, e.g. direction 110, may reveal a portion of the second wallpaper image 140, a multi-touch gesture 108 in an opposite direction may conceal the previously revealed second wallpaper image 140 thereby returning to the first wallpaper image 130. Other embodiments are described and claimed.

While the multi-touch gesture is shown in FIG. 1A as beginning in the top left corner of the display 120, it should be understood that any suitable point or points on the display 120 may be selected as a hot position or starting position for initiating the wallpaper transition process. For example, in some embodiments, the position for initiating transition to the next wallpaper image may be in the top left, middle left, or bottom left portion of the display and may require a multi-touch gesture 108 in a direction toward the right side of the display 120. Additionally, the position for initiating transition to a previous wallpaper image may be in the top right, middle right or bottom right portion of the display 120 and may require a multi-touch gesture 108 in a direction toward to the left side of the display 120. Also, the position for initiating the transition may be in the middle top or middle bottom portion of the display 120 and require a downward or upward multi-touch gesture respectively.

In some embodiments, the position for initiating the transition may be identified by a ribbon, icon or other small and substantially unobtrusive indicator on the display 120 such that the user simply begins a multi-touch gesture at the identified position to begin the wallpaper transition process. The position may be user selected during a device setup process or in the device settings. In some embodiments, the position may be determined in advance and placed in a default location.

Once the initiation position is selected or determined, the wallpaper transition process can be completed without revisiting the user or system preferences, menus or settings. Additionally, in some embodiments, the location is not identified by any indicator on the display 120 and simply acts as a hot spot or other position suitable for initiating the wallpaper transition. Other embodiments are described and claimed.

In various embodiments, repeated complete multi-touch gestures 108 may result in the revealing of consecutively different wallpaper images. For example, if a user swipes or performs a multi-touch gesture 108 from the top left to the bottom right of the screen, as shown in FIG. 1A, a second wallpaper image 140 may be revealed. If additional similar multi-touch gestures are performed and completed, additional wallpaper images may be revealed. Similarly, if repeated multi-touch gestures are performed in the opposite direction, previously revealed wallpaper images may again be displayed. For example, consecutive wallpaper images may be displayed in response to consecutive multi-touch gestures 108.

In some embodiments, the consecutive wallpaper images may be retrieved from an image or application database. In various embodiments, the consecutive wallpaper images may be retrieved from a database located remote from the mobile computing device 102. For example, wallpaper images may be purchased or downloaded for free from a remote source directly to the mobile computing device 102. In some embodiments, the order of the wallpaper images may be defined or random and the order or randomness may be user selectable. Other embodiments are described and claimed.

The selection of a wallpaper image does not require any confirmation in some embodiments. For example, the selection of the second wallpaper image 140 may be initiated and completed by simply completing the multi-touch gesture 108. In this manner, obtrusive notifications such as OK/SAVE/CONFIRM/etc. can be avoided.

In some embodiments, after all wallpaper image options are exhausted, the next wallpaper in the queue may comprise application wallpapers contained on the mobile computing device 102 corresponding to applications on the mobile computing device 102. In various embodiments, exhaustion of wallpaper image options may result in the presentation of suggested, popular or other wallpaper images for download or purchase. Other embodiments are described and claimed.

In various embodiments, the wallpaper image may comprise an application wallpaper that is dynamically updated in response to changes in a corresponding application. In some embodiments, changes that occur in the corresponding application may be reflected in the application wallpaper. For example, the wallpaper may comprise a weather, stock market, social networking or other suitable theme corresponding to an associated application. For example, if a weather application is selected, a corresponding weather wallpaper application may also be selected that dynamically displays relevant information in the background, such as the sun if the local forecast call for sunny skies. In some embodiments, the corresponding application wallpaper may be automatically selected based on a selected application.

In some embodiments, the wallpaper transition process may be animated or include transitions to create a more appealing user experience. For example, in FIG. 1A, the first wallpaper image 130 may appear to roll up like a rolled piece of paper as the multi-touch gesture 108 moves from the top left corner to the bottom right corner and unrolled if the multi-touch gesture were to reverse and move in the opposite direction. It should be understood that any suitable animation or transition may be used and still fall within the described embodiments. For example, blending, rolling, sliding, compressing, dissolving or any other animation or transition may be used.

In various embodiments, different multi-touch gestures such as pinching-in or pinching-out may be used to resize a wallpaper image. Additionally, multi-touch gestures not originating in the specified transition initiation position may be used to move or drag a wallpaper image to a new location. For example, a user may hold their finger to the display 120 for a set amount of time, thereby initiating the ability to relocate the wallpaper image. Additionally, in some embodiments, methods other than use of a hot spot or initiation point for starting the transition process may be used. For example, holding a finger on a display in a fixed position for a specified period of time, taping a finger multiple times, or any other recognizable and simple gesture may be used to initiate the dynamic wallpaper interaction capability. For example, two, three, four or any number of taps on the screen may be configured to activate dynamic wallpaper interactions and subsequent scrolling motions may be used to select an appropriate wallpaper image. Additionally, in some embodiments, multi-touch gestures such as tapping may also be used to confirm selection of a desired wallpaper image. Other embodiments are described and claimed.

Figure 1B:
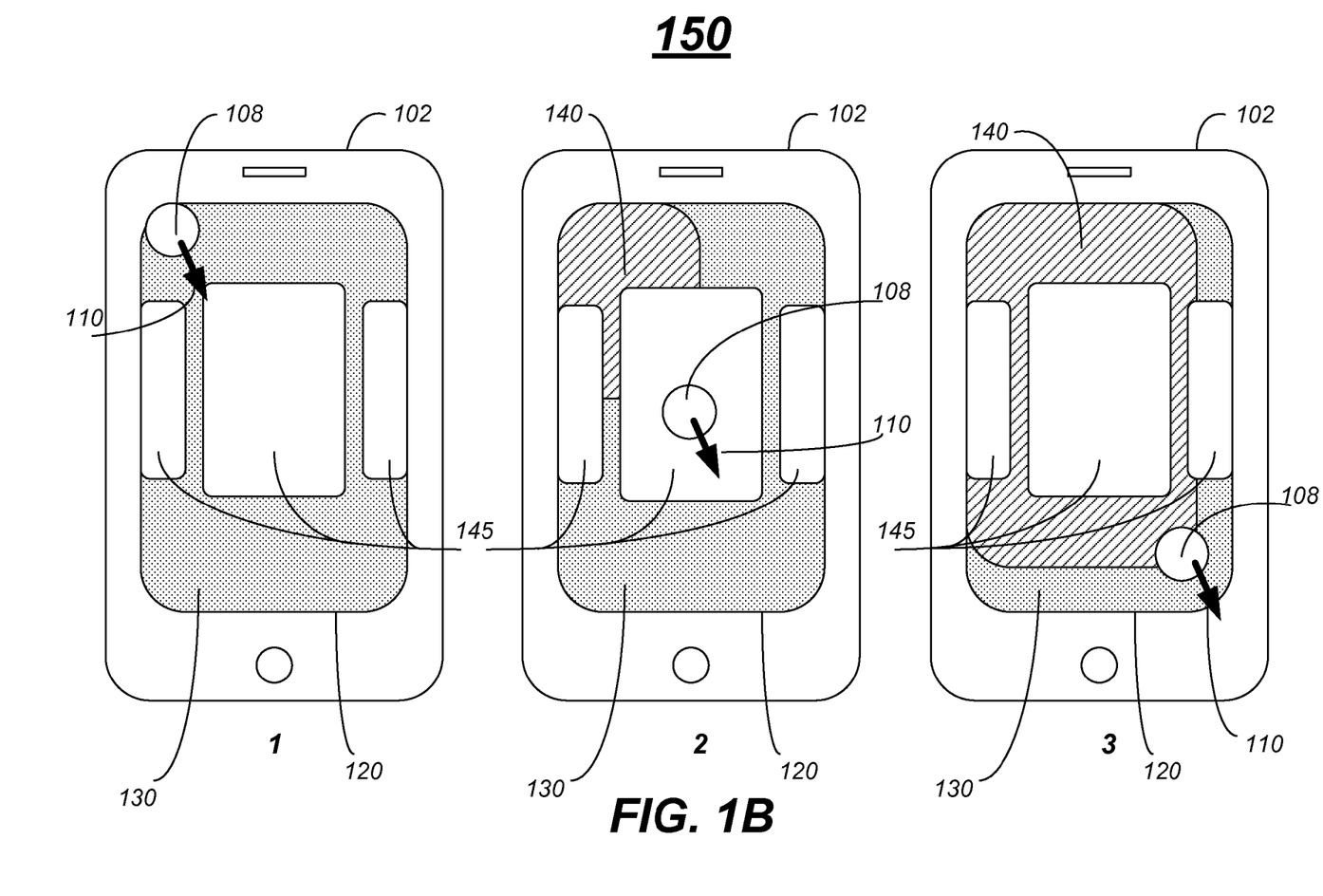
FIG. 1B illustrates one embodiment of a mobile computing device.

FIG. 1B illustrates a flow 150 similar to flow 100 shown in FIG. 1A. Similar to FIG. 1A, FIG. 1B includes a mobile computing device 102 having a multi-touch sensitive display 120, a first wallpaper image 130 and a second wallpaper image 140. Also, a multi-touch gesture 108 and a direction 110 are similarly illustrated in FIG. 1B. Unlike FIG. 1A, however, FIG. 1B illustrates application windows or cards 145. Cards 145 may represent applications that are running on mobile computing device 102 that may be selected and utilized by a user of the device 102.

In various embodiments, as shown in FIG. 1B, the one or more application windows or cards 145 may be displayed on top of the first 130 or second 140 wallpaper images. In some embodiments, at least a portion of the first 130 or second 140 wallpaper images are displayed behind the one or more application windows or cards 145 and the dynamic wallpaper interactions described above with respect to FIG. 1A may still be implemented despite the presence of the cards 145. For example, in response to the multi-touch gesture 108 that may or may not overlap the one or more application windows or cards 145, the dynamic wallpaper interactions may be completed as described above. Other embodiments are described and claimed.

In some embodiments, an auditory queue may be sounded indicating that one or more application windows or cards 145 are associated with a second 140 or other wallpaper image. For example, as a user transitions from the first wallpaper image 130 to the second wallpaper image 140, a smacking or other sound may be used to indicate that the visible cards are associated with the predominantly displayed wallpaper image. In some embodiments, visual queues such as shacking the cards 145 when a new association is made or tactile queues such as vibrating the device when a new card 145 association is made may also be used and still fall within the described embodiments.

Figure 2:
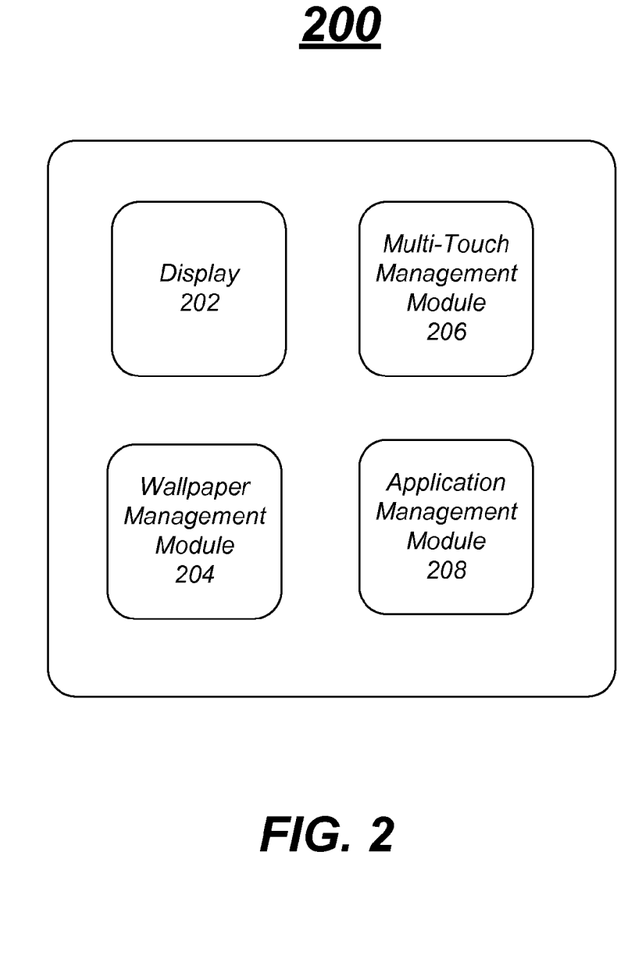
FIG. 2 illustrates one embodiment of a mobile computing device.

FIG. 2 illustrates one embodiment of a group of modules 200. In particular, FIG. 2 shows a display 202, a wallpaper management module 204, a multi-touch management module 206 and an application management module 208. The multi-touch-sensitive display may be the same or similar to the display 120 of mobile computing device 102 described above with reference to FIGS. 1A and 1B. These elements or portions of these elements may be implemented in hardware, software, firmware, or in any combination thereof. The embodiments are not limited to these depicted elements. It should be understand that the modules 200 may be implemented as part of or in communication with mobile computing device 102 of FIGS. 1A and 1B. in various embodiments.

In various embodiments, the wallpaper management module 204 may be operative to display a first wallpaper image on the multi-touch-sensitive display 202 and to display at least a portion of a second wallpaper image in response to a multi-touch gesture indicating a request to change the first wallpaper image. For example, the wallpaper management module 204 may be operative to manage the currently displayed wallpaper image and also to retrieve wallpaper images from an internal or external wallpaper image database or other source.

In some embodiments, the multi-touch management module 206 may be operative to receive multi-touch gestures from the multi-touch-sensitive display 202. For example, the multi-touch management module 206 may be operative to receive and interpret gestures or touches made by a user on the multi-touch-sensitive display 202. In some embodiments, at least one multi-touch gesture may indicate a request to change the first wallpaper image. In various embodiments, the multi-touch gesture may comprise a left-to-right, right-to-left, top-to-bottom, bottom-to-top or corner-to-corner diagonal scrolling gesture beginning at one of four edges of the first wallpaper image and ending at an opposite edge of the first wallpaper image or beginning at one of four corners of the first wallpaper image and ending at an opposite corner of the first wallpaper image.

In various embodiments, the scrolling gesture results in the wallpaper management module 204 displaying a proportional portion of the second wallpaper image along with a proportional portion of the first wallpaper image based on a position of the scrolling gesture on the multi-touch-sensitive display 202. For example, as shown in FIG. 1A, the position of the multi-touch gesture 108 may dictate how much of each of the first 130 and second 140 wallpaper images is revealed. In some embodiments, the multi-touch gesture indicating a request to change the first wallpaper image comprises a pinch-in gesture or a pinch-out gesture to resize the first wallpaper image.

The application management module 208 may be operative to display one or more application windows on top of the first or second wallpaper images in some embodiments. For example, as shown in FIG. 1B, application windows or cards 145 may be displayed over top of the first 130 and second 140 wallpaper images and the dynamic wallpaper interaction operations may still take place in the background without interfering with the application windows or cards 145. For example, at least a portion of the first 130 or second 140 wallpaper image may be displayed behind the one or more application windows 145 in response to the multi-touch gesture and the multi-touch gesture may overlap the one or more application windows 145. Other embodiments are described and claimed.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
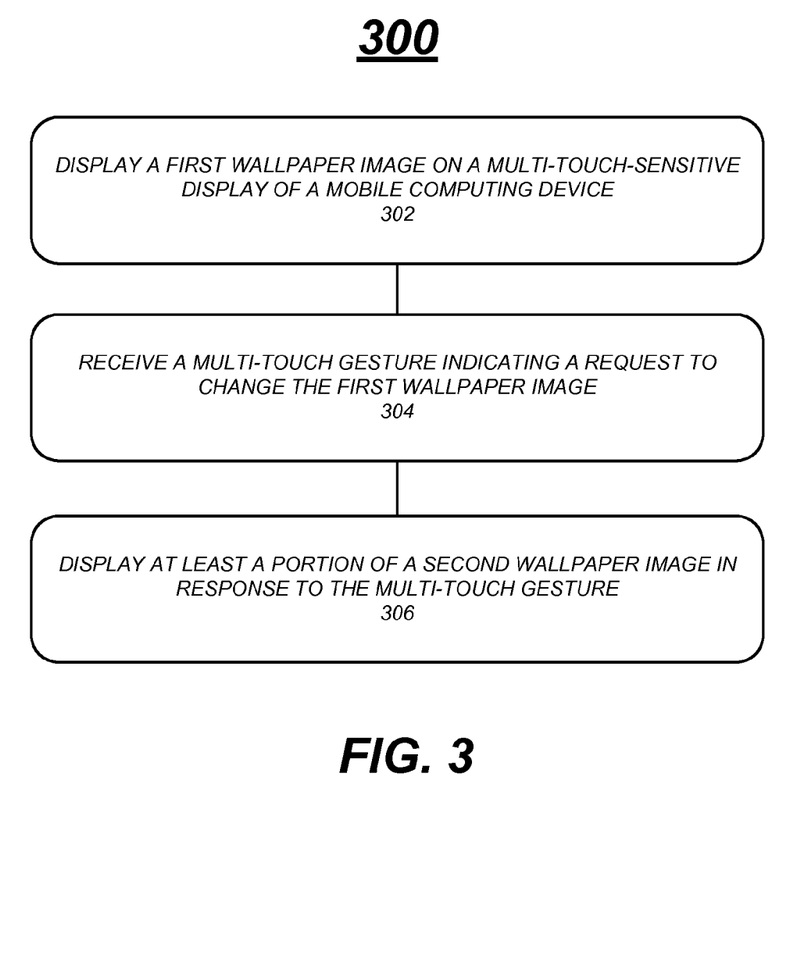
FIG. 3 illustrates one embodiment of a logic diagram.

FIG. 3 illustrates a logic diagram. In particular, FIG. 3 illustrates a logic diagram 300, which may be representative of the operations executed by one or more embodiments described herein. As shown in the FIG. 3, a first wallpaper image may be displayed on a display of a mobile computing device at 302. For example, first wallpaper image 130 is displayed on display 120 of mobile computing device 102 in FIG. 1A. At 304, a multi-touch gesture indicating a request to change the first wallpaper image may be received. For example, a user may touch the display 120 (e.g. multi-touch gesture 108) indicating a desire to change wallpaper image 130.

In various embodiments, at least a portion of the second wallpaper image may be displayed in response to the multi-touch gesture at 306. For example, as shown in FIGS. 1A-2 and 1A-3, as the user moves the gesture 108 to different locations on the display 120, proportionally consistent amounts of first wallpaper image 130 and second wallpaper image 140 are displayed on the display 120 of mobile computing device 102. Other embodiments are described and claimed.

Figure 4:
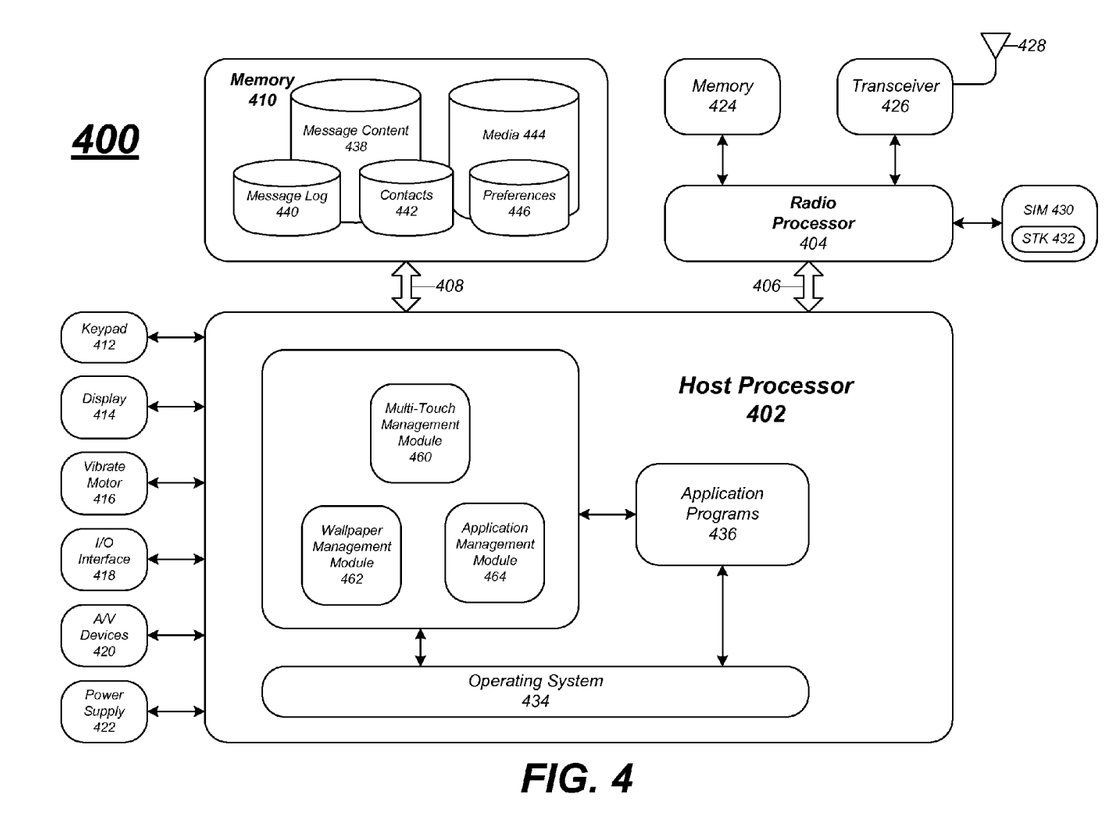
FIG. 4 illustrates one embodiment of a mobile computing device.

FIG. 4 illustrates a block diagram of a mobile computing device 400 suitable for implementing various embodiments, including the mobile computing devices described in FIGS. 1A and 1B. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414. In some embodiments, the keypad may comprise a fixed or sliding keypad. The keypad may also comprise a thumbboard.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with any suitable touch input, including a human finger, a stylus and/or a handwriting recognizer program. In various embodiments, the display 414 may comprise a multi-touch-sensitive display.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC) or a wired or wireless network. In various implementations, mobile computing device 400 may be arranged to synchronize information with a local computer system or a remote computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, an MP3 player and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and synchronous dynamic random access memory (SDRAM). Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas. In various embodiments, the antenna system may use various components of the mobile computing device 400 to enhance signal reception. For example, in some embodiments, metal sliders used to connect a sliding keypad to a display may be used as part of the antenna system. Other embodiments are described and claimed.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a WebOS®, Palm OS®, Palm OS® Cobalt, Apple iPhone OS®, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a multi-touch management module 460, a wallpaper management module 462 and an application management module 464 is some embodiments. The multi-touch management module 460, wallpaper management module 462 and application management module 464 may the same or similar to the multi-touch management module 206, wallpaper management module 204 and application management module 208 described with reference to FIG. 2 in some embodiments.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a computer readable storage medium arranged to store logic, data and/or computer readable instructions for performing various operations of one or more embodiments when executed by a processor. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   displaying a first wallpaper image on a multi-touch-sensitive display of a mobile computing device, wherein one or more application icons are provided on the first wallpaper image;
   displaying an indicator for initiating a wallpaper transition on the display;
   receiving a user input on the displayed indicator for initiating the wallpaper transition, the user input including a dragging gesture starting from the indicator to enable the wallpaper transition; and
   dynamically displaying a second wallpaper image in response to receiving the user input;
   wherein the one or more application icons remain stationary while the second wallpaper image is dynamically displayed; and
   wherein the first and the second wallpaper images are background images of the mobile computing device.

2. The method of claim 1, wherein the dragging gesture includes one or more of a left-to-right, right-to-left, top-to-bottom, bottom-to-top or corner-to-corner diagonal dragging gesture.

3. The method of claim 2, wherein the dragging gesture results in a proportional portion of the second wallpaper image displayed along with a proportional portion of the first wallpaper image based on a position of the dragging gesture on the multi-touch-sensitive display.

4. The method of claim 1, wherein the displayed indicator is further configured to allow a user to resize a given wallpaper image using a pinch-in gesture or a pinch-out gesture.

5. The method of claim 1, further comprising:
   sounding an auditory queue indicating that one or more applications are associated with the second wallpaper image.

6. The method of claim 1, wherein the first or the second wallpaper image comprises an application wallpaper dynamically updated in response to changes in a corresponding application.

7. The method of claim 1, wherein the first or the second wallpaper image is automatically selected based on a selected application.

8. The method of claim 1, further comprising:
   displaying consecutive wallpaper images in response to consecutive user inputs, each of the consecutive user inputs including a dragging gesture.

9. The method of claim 8, further comprising:
   retrieving the consecutive wallpaper images from an image or application database.

10. A non-transitory computer-readable storage medium containing instructions that, when executed by one or more processors, cause the one or more processors to:
    display a first wallpaper image on a multi-touch-sensitive display of a mobile computing device, wherein one or more application icons are provided on the first wallpaper image;
    display an indicator for initiating a wallpaper transition on the display;
    receive a user input on the displayed indicator for initiating the wallpaper transition, the user input including a dragging gesture starting from the indicator to enable the wallpaper transition; and
    dynamically display a second wallpaper image in response to receiving the user input;
    wherein the one or more application icons remain stationary while the second wallpaper image is dynamically displayed; and
    wherein the first and the second wallpaper images are background images of the mobile computing device.

11. The non-transitory computer readable medium of claim 10, wherein the dragging gesture includes one or more of a left-to-right, right-to-left, top-to-bottom, bottom-to-top or corner-to-corner diagonal dragging gesture.

12. The non-transitory computer readable medium of claim 11, wherein the dragging gesture results in a proportional portion of the second wallpaper image displayed along with a proportional portion of the first wallpaper image based on a position of the dragging gesture on the multi-touch-sensitive display.

13. The non-transitory computer readable medium of claim 10, wherein the displayed indicator is further configured to allow a user to resize a given wallpaper image using a pinch-in gesture or a pinch-out gesture.

14. The non-transitory computer readable medium of claim 10, wherein the instructions, when executed by the one or more processors, further cause the one or more processors to:
    sound an auditory queue indicating that one or more applications are associated with the second wallpaper image.

15. The non-transitory computer readable medium of claim 10, wherein the first or the second wallpaper image comprises an application wallpaper dynamically updated in response to changes in a corresponding application.

16. The non-transitory computer readable medium of claim 10, wherein the first or the second wallpaper image is automatically selected based on a selected application.

17. The non-transitory computer readable medium of claim 10, wherein the instructions, when executed by the one or more processors, further cause the one or more processors to:

display consecutive wallpaper images in response to consecutive user inputs, each of the consecutive user inputs including a dragging gesture.

18. The non-transitory computer readable medium of claim 17, wherein the instructions, when executed by the one or more processors, further cause the one or more processors to:
retrieve the consecutive wallpaper images from an image or application database.

19. A mobile computing device, comprising:
a multi-touch-sensitive display;
a wallpaper management module to display a first wallpaper image on the multi-touch sensitive display, and to display an indicator for initiating a wallpaper transition on the display, wherein one or more application icons are provided on the first wallpaper image; and
a multi-touch management module to receive a user input on the displayed indicator for initiating a wallpaper transition, the user input including a dragging gesture starting from the indicator to enable the wallpaper transition;
wherein the wallpaper management module dynamically displays a second wallpaper image in response to receiving the user input;
wherein the one or more application icons remain stationary while the second wallpaper image is dynamically displayed; and
wherein the first and the second wallpaper images are background images of the mobile computing device.

20. The mobile computing device of claim 19, wherein the dragging gesture includes one or more of a left-to-right, right-to-left, top-to-bottom, bottom-to-top or corner-to-corner diagonal dragging gesture.

21. The mobile computing device of claim 20, wherein the dragging gesture causes the wallpaper management module to display a proportional portion of the second wallpaper image along with a proportional portion of the first wallpaper image based on a position of the dragging gesture on the multi-touch-sensitive display.

22. The mobile computing device of claim 19, wherein the displayed indicator is further configured to allow a user to resize a given wallpaper image using a pinch-in gesture or a pinch-out gesture.

* * * * *